Oct. 13, 1925.  
E. R. SAGER  
DUPLEX HEADLIGHT  
Filed May 10, 1924  
1,557,097
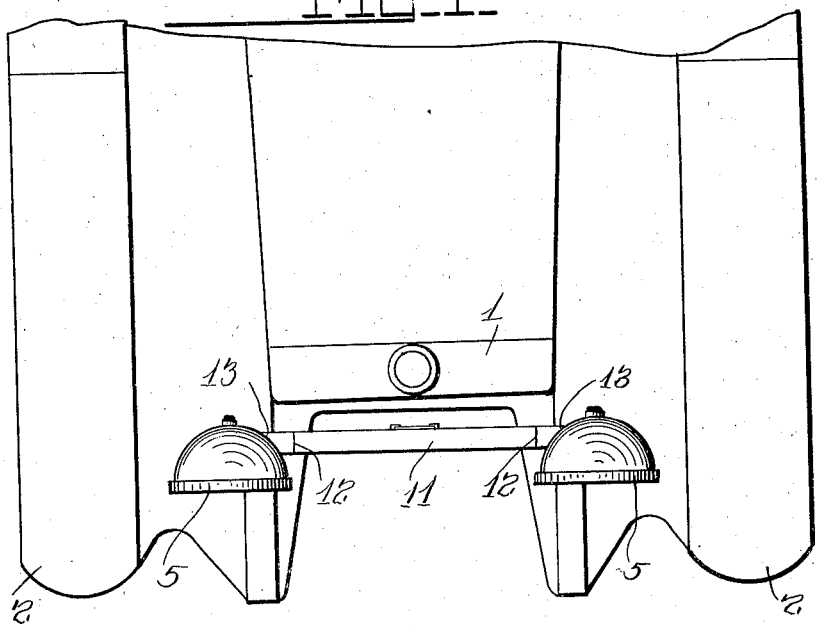
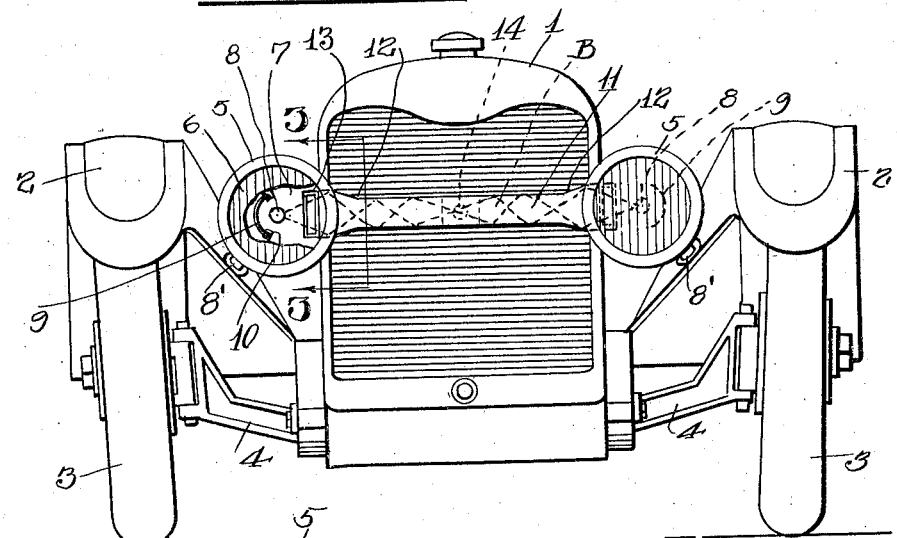
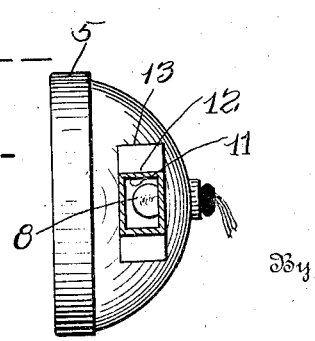
Inventor  
E. R. Sager,
Attorney Patented Oct. 13, 1925.

1,557,097

UNITED STATES PATENT OFFICE.

EDWARD RAYMOND SAGER, OF SEATTLE, WASHINGTON.

DUPLEX HEADLIGHT.

Application filed May 10, 1924. Serial No. 712,349.

*To all whom it may concern:*

Be it known that EDWARD R. SAGER, citizen of the United States, residing at Seattle, in the county of King and State of Washington, has invented certain new and useful Improvements in Duplex Headlights, of which the following is a specification.

This invention relates to improvements in automobile headlights, and more particularly to such lights as are commonly carried upon motor vehicles. The principal object of the invention is to provide a lighting system wherein the reflective power of the ordinary headlight is increased and so arranged that when either of a pair of headlights is out of commission, the one which is still glowing will be so reflected as to illuminate the normal area of the disabled light so that the driver of the vehicle can at all times be assured of the substantial effect of both lights, even though but one bulb be lighted. An important feature also is that if both the headlights become disabled, the operator may cause light to be reflected from the normal area of each by means which are conveniently within his control, as for example, upon the instrument board.

In the drawings:

Fig. 1 is a plan of the forward portion of an automobile, the improved lighting system being shown.

Fig. 2 is a front elevation of the same.

Fig. 3 is a section on line 3—3 of Fig. 2.

In the drawings, 1 indicates an ordinary radiator, 2 the front fender, 3 the traction wheels, and 4 the axle, all of which may be of any approved and usual construction. 5 indicates the headlight casings which are of usual shape and each provided with a lens 6, and a reflector 7. 8' indicates the usual bracket which supports the headlight and 9 indicates a reflector for lateral reflection, which reflector may be held in place beneath a bead 10 on the casing. 11 indicates a transverse tubular member which is preferably of retangular formation as shown, although it may be of any suitable transverse form. The tubular member 11 is flared out beginning with the point 12 and ending at the point 13 for a purpose which will presently be made plain. 14 is a light bulb which is controlled by an independent switch upon the instrument board. This light 14 is an emergency light, and is normally de-energized. The two bulbs 8 are of course the normal light source. The interior walls of the hollow member 11 are of reflective material.

When the two lights 8 are glowing in the usual manner, one will assist the other in brilliancy and reflective power, because the light rays indicated at B in Fig. 1 converge toward the center of the tubular member 11 and will direct some of those rays up to the tapered portions between the points 12 and 13 as shown plainly in Fig. 1, other rays will be directed downwardly against the lower walls of the flared portion. Both sets of rays will be deflected upwardly and downwardly as shown and accordingly as they come from the upper or lower half of the headlight, the result being that these rays of light deflect along from right to left from one headlight and in the reverse direction from the other with the result that both the headlights are of more brilliancy than they would otherwise be.

If one of the lamps 8 becomes defective and ceases to glow, light rays will still be reflected from that particular casing headlight due to the light from the other headlight reflected transversely through the tubular member 11. If both of the lamps 8 in the headlights should become dead for any cause, the operator may turn on the switch upon the instrument board and energize the light 14, the rays from which will be reflected back and forth along the inner walls of the tubular member 11 in both directions and will obviously illuminate the reflective surface within each headlight casing and the rays will in turn be directed forward from the headlight casings. When parking, it will not be necessary to keep the headlights burning but only the emergency light which will of course consume less electrical energy as would be the case if both the headlights were burning. It is possible that under usual circumstances, neither of the lamps 8 need be energized at all, unless the most intense light be required and then the emergency light may be energized with the headlights with the resultant increased illumination. The result of all of this arrangement is that it is possible to employ one lamp only and still have the advantage of a plurality of lights.

Claims:

1. In a lighting system for vehicles, headlights, reflectors therefor, sources of illumination within the headlights, and a tubular member arranged between the headlights, said tubular member being closed throughout its length and the head lights and reflectors therein being formed with openings through which the source of illumination in said head lights may reach the interior of the tubular member.

2. In a lighting system for vehicles, headlights, reflectors therefor, sources of illumination within the headlights, and a closed tubular member arranged between the headlights, said head lights and reflectors therein being formed with openings in line with the tubular member and with the sources of illumination in said head lights.

In testimony whereof I affix my signature.

EDWARD RAYMOND SAGER.